United States Patent [19]

Chang

[11] Patent Number: 5,164,886
[45] Date of Patent: Nov. 17, 1992

[54] COMPUTER MAINFRAME HOUSING ASSEMBLED WITH HOOKS AND NOTCHES

[76] Inventor: Lien-Sheng Chang, No. 297, Chungshan Yi Rd., Lu Chu Hsiang, Taipei Hsien, Taiwan

[21] Appl. No.: 808,758

[22] Filed: Dec. 17, 1991

[51] Int. Cl.⁵ .................. A05K 5/02; G06F 1/00; A47B 47/02
[52] U.S. Cl. .................. 361/390; 361/380; 361/429; 312/257.1
[58] Field of Search ........ 364/708; 312/265.1, 312/265.2, 265.3, 265.4, 265.5, 265.6, 257.1; 361/380, 390, 391, 427, 429

[56] References Cited

U.S. PATENT DOCUMENTS

| | | | |
|---|---|---|---|
| 4,672,510 | 6/1987 | Castner | 364/708 X |
| 4,717,216 | 1/1988 | Hornak | 361/390 X |
| 4,725,244 | 2/1988 | Chewning et al. | 361/391 X |
| 4,964,017 | 10/1990 | Jindrick et al. | 361/390 |
| 5,031,070 | 7/1991 | Hsu | 361/380 |
| 5,051,868 | 9/1991 | Leverault et al. | 364/708 X |

Primary Examiner—Leo P. Picard
Assistant Examiner—Michael W. Phillips
Attorney, Agent, or Firm—Varndell Legal Group

[57] ABSTRACT

A computer mainframe housing, including an under body having a shackle secured to a rear side wall thereof at an outer side by springs for fastening the housing to a support, a cross bar suspended inside said under body for hanging a diskdrive holder, a top cover covering the under body and secured thereto through hook joints, and a front panel fixedly secured to the top cover and covering the front side wall of the under body. The front panel has a lock controlled by a key to lock a cam in a key hole on the front side wall of the under body.

1 Claim, 5 Drawing Sheets

COMPUTER MAINFRAME HOUSING ASSEMBLED WITH HOOKS AND NOTCHES

BACKGROUND OF THE INVENTION

The present invention relates to computer mainframe housings and relates more particularly to a computer mainframe housing which has a shackle retained to a rear side wall thereof by spring means for fastening to a support, and a lock on the front panel thereof controlled by a key to lock a top cover.

A personal computer mainframe housing is generally comprised of an under body for holding mother boards, interface cards, power supply and diskdrives, a top cover covered on said under body for protection, and a front panel for operation control and insertion of diskettes. In this structure of computer mainframe housing, the top cover is secured to the under body by screws. This structure of computer mainframe housing is still not satisfactory in use. One disadvantage of this structure of computer mainframe housing is that the housing requires much time to assemble. Another disadvantage of this structure of computer mainframe housing is that any person who is not authorized can easily open the top cover to damage the internal structure of the mainframe. Although a keyboard lock may be provided on the front panel, it still can be easily damaged by opening the top cover.

SUMMARY OF THE INVENTION

The present invention has been accomplished to eliminate the aforesaid disadvantages. It is therefore an object of the present invention to provide a computer mainframe housing for a computer system, which has a lock means controlled by a key to lock up the top cover thereof so as to prohibit others from opening the housing.

It is another object of the present invention to provide a computer mainframe housing for a computer system, which has a shackle means for fastening the housing to a support so as to prohibit others from taking away the computer system.

It is still another object of the present invention to provide a computer mainframe housing for a computer system, which is easy to assemble and convenient to detach.

It is still another object of the present invention to provide a computer mainframe housing for a computer system, which has a cross member at the inside for fastening a diskdrive holder through hook joints.

DETAILED DESCRIPION OF THE PREFERRED EMBODIMENT

Figure 1:
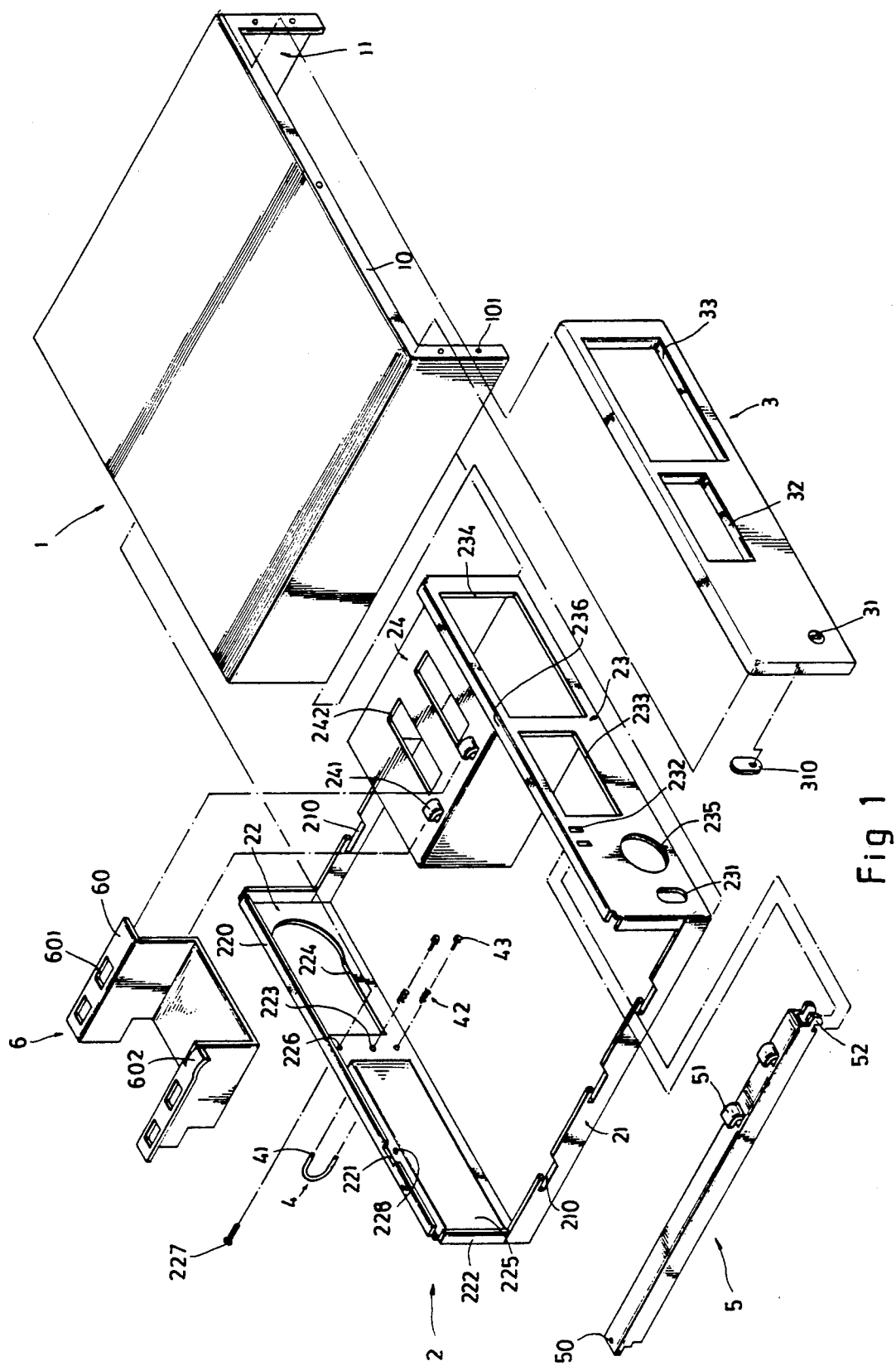
FIG. 1 is an exploded perspective view of a computer mainframe housing embodying the present invention.
Figure 2:
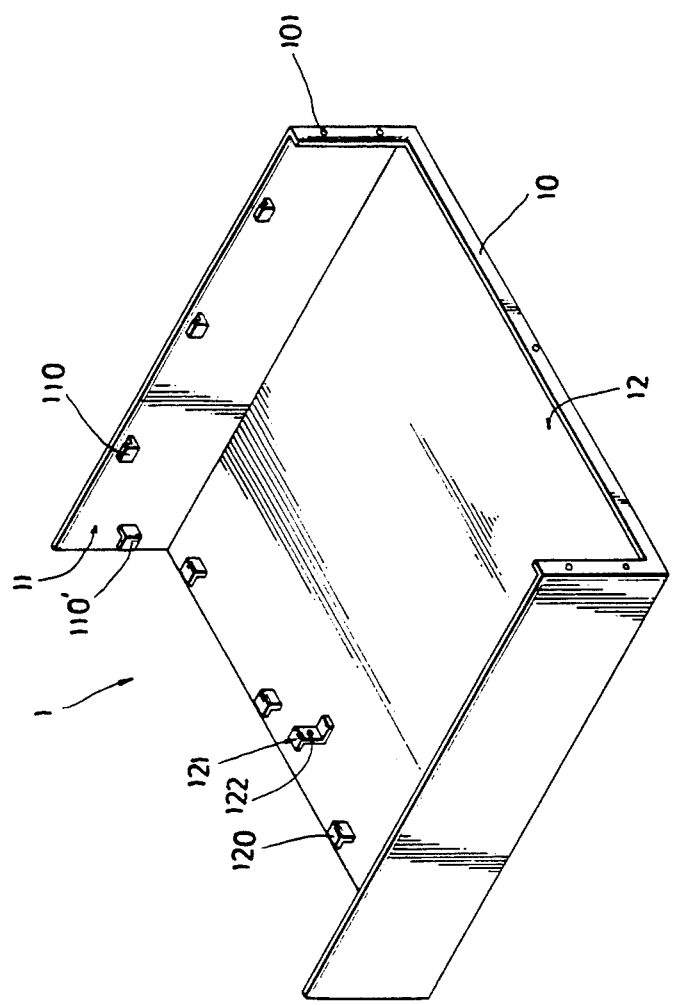
FIG. 2 is a perspective view of the top cover showing its internal structure.

Referring to FIGS. 1 and 2, a computer mainframe housing according to the present invention is generally comprised of a top cover 1, an under body 2, a front panel 3, a shackle 4, a cross bar 5, and a holder 6 for a 3½" diskdrive. The top cover 1 is made from a sheet of metal into a substantially U-shaped structure through the process of bending, having a plurality of through holes 101 on a peripheral flange 10 thereof at one side for fastening the front panel 3 by screws, a plurality of hooks 110, 110' on two opposite vertical end walls 11 thereof at the inside, a plurality of spaced hooks 120 and a connecting plate 121 on a flat bottom 12 thereof at one side opposite to the peripheral flange 10, wherein the connecting plate 121 has a bolt hole 122 thereon at a suitable location. The under body 2 comprises two vertical side walls, namely, a front side wall 23 and a rear side wall 22 vertically disposed at two opposite sides thereof, and two vertical, symmetrical end stops 21 vertically disposed at two opposite ends thereof, and a fixed holder 24 for a 5¼" diskdrive. The two side walls 23, 22 are much higher than the two end stops 21. The end stops 21 each has a plurality of spaced notches 210 for hooking the hooks 110 of the top cover 1 respectively. The rear side wall 22 of the under body 2 includes two opposite end flanges 222 vertically disposed at two opposite ends thereof for hooking the hooks 110' of the top cover 1 respectively, a top flange 220 transversely disposed at a top thereof for hooking the hooks 120 of the top cover 1, two through holes 223 at the middle for fastening the shackle 4, a through hole 226 corresponding to the bolt hole 122 on the connecting plate 121, a heat dissipation hole 224 and an interface card holder 225 at two opposite locations. The interface card holder 225 has a bolt hole (internally threaded portions) 228 on the topmost edge thereof for fastening the cross bar 5. The top flange 220 of the rear side wall has an opening 221 above the bolt hole 228 for mounting the cross bar 5. The front side wall 23 of the under body 2 has two retaining holes 232 corresponding to the bolt hole 228 for fastening the cross bar 5, a hole 231 for a cam 310 from a lock 31 which is secured to the front panel 3, a slot 233 for a 3½" diskdrive, a slot 234 for a 5¼" diskdrive in line with the fixed holder 24, a hole 235 for fastening a speaker, and a top flange 236 transversely disposed at a top thereof. The fixed holder 24 has a plurality of hooks 241 and openings 242 on a top edge thereof. The arrangement of the openings 242 is to reduce material consumption. The hooks 241 are provided for holding the holder 6. The front panel 3 has a plurality of bolt holes on a back surface thereof (not shown) respectively secured to the through holes 101 on the peripheral flange 10 of the top cover 1 by screws, a small diskdrive slot 32 and a big diskdrive slot 33 corresponding to the slots 233, 234 on the front side wall 23 of the under body 2, and a lock 31 corresponding to the hole 231 on the front side wall 23 of the under body 2. The shackle 4 has two bolt holes (internally threaded portions) 41 on two opposite ends thereof. The cross bar 5 is made from an elongated channel bar having a through hole 50 on a top edge thereof at one end corresponding to the bolt hole 228 on the interface card holder 225, two hooks 52 longitudinally disposed at an opposite end corresponding to the retaining holes 232 on the front side wall 23 of the under body 2, and a plurality of hooks 51 on the top edge thereof corresponding to the hooks 24 on the fixed holder 24 for holding the holder 6. The holder 6 is for holding a 3½" diskdrive, having two opposite, outward flanges 60 transversely disposed at the top and a plurality of holes 601 on the two opposite, outward flanges 60 thereof for hooking the hooks 241 or 51. Further, one of the flanges 60 has one end processed into a unitary, curved plate spring 602.

Figure 3:
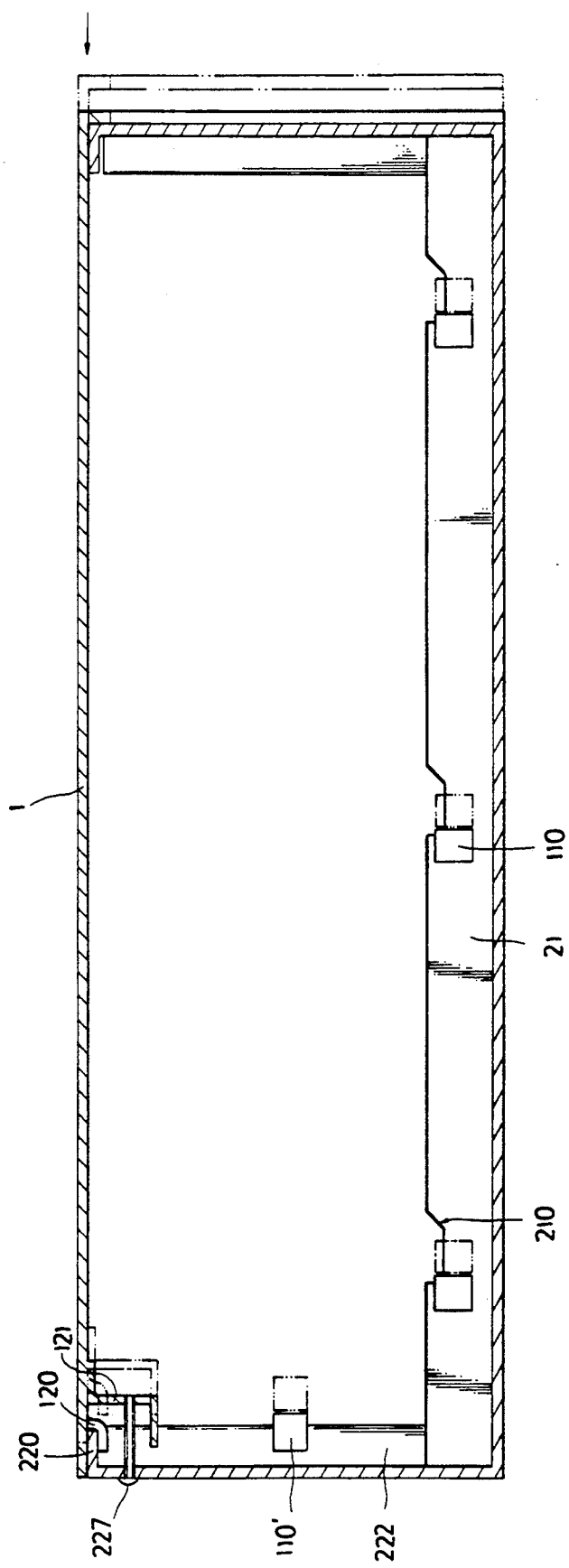
FIG. 3 is a plan assembly view showing the connection of the top cover with the under body.
Figure 4:
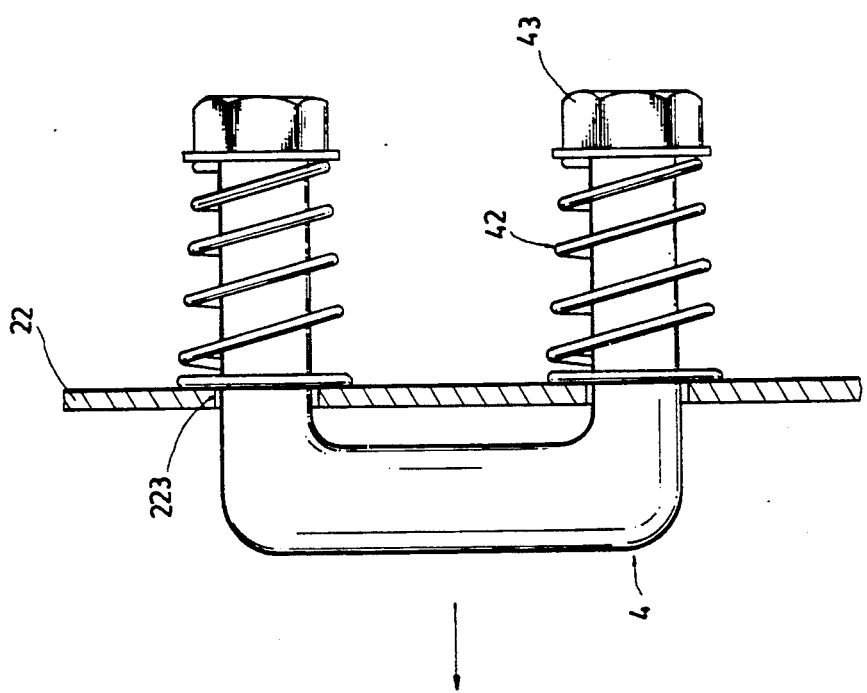
FIG. 4 is an assembly view of the shackle in an enlarged scale.
Figure 5:
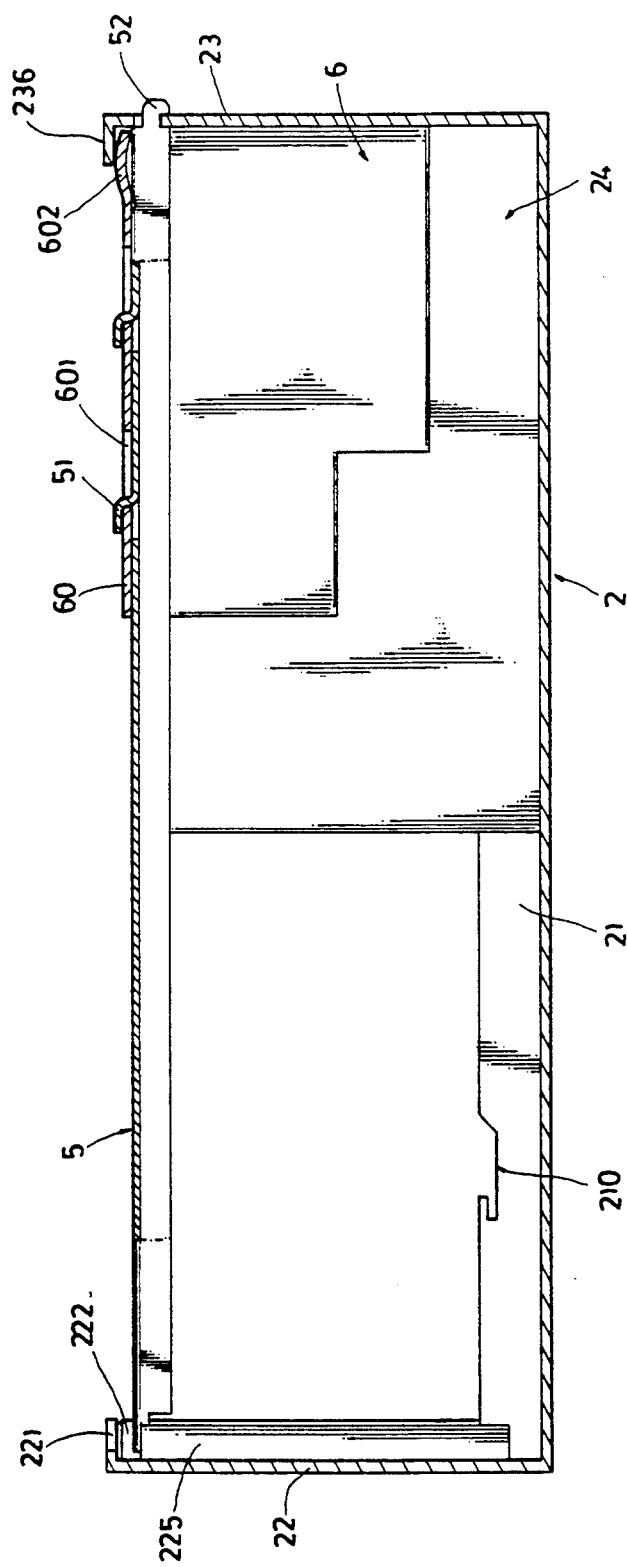
FIG. 5 is a side sectional view of the housing showing the connections of the cross bar with the under body and the 3½" diskdrive holder.

The assembly process of the present invention is outlined hereinafter with reference to FIGS. 3, 4 and 5. The two opposite ends of the shackle 4 are respectively inserted into the holes 223 and secured to the rear side wall 22 of the under body 2 at an outer side by two screw (threaded) bolts 43 and two compression springs 42, wherein the compression springs 42 are respectively sleeved on the shackle 4 and retained between the rear side wall 22 and screw bolts 43, the screw bolts 43 are respectively screwed into the bolt holes 41 on the two opposite ends of the shackle 4 (see FIG. 4). By means of the shackle 4, the computer mainframe housing can be secured to a support or an object. The two hooks 52 at one end of the cross bar 5 are respectively hooked in the retaining holes 232 on the front side wall 23, and the opposite end of the cross bar 5 is inserted into the opening 221 with the through hole 50 thereof aligned with the bolt hole 228 on the interface card holder 225 and secured in place by a screw (not shown). As soon as the cross bar 5 is fixed, the hooks 51 thereon are respectively disposed in line with the hooks 241 on the holder 24 for hanging the holder 6. Once the hooks 51, 241 are respectively hooked in the holes 601, the holder 6 is suspended between the holder 24 and the cross bar 5 with the plate spring 602 firmly retained between the cross bar 5 and the top flange 236 of the front side wall 23 (see FIG. 5). Therefore, the holder 6 is firmly retained to the under body 2. Then, the front panel 3 is secured to the peripheral flange 10 of the top cover 1 by screws (not shown). As soon as the front panel 3 and the top cover 1 are secured together, the top cover 1 is mounted on the under body 2 to form a housing for a computer mainframe. Once the top cover 1 is mounted over the under body 2, the hooks 110 are respectively hooked in the notches 210 on the two end stops 21 of the under body 2 (see FIG. 3), then, the top cover 1 is pushed inwards along a direction from the front side wall 23 toward the rear side wall 22 permitting the hooks 110′, 120 to be respectively hooked in the end flanges 222 and the top flange 220 of the rear side wall 22 of the under body 2, and then, fasten a screw 227 through the through hole 226 into the bolt hole 122 on the connecting plate 121 to firmly secure the top cover 1 to the under body 2. Once the top cover 1 and the under body 2 are secured together, the front panel 3 covers on the front side wall 23 of the under body 2. When the lock 31 is locked, the front panel becomes firmly secured to the under body 2. Even if the screw 227 is removed from the through hole 226, the top cover 1 is still firmly secured to the under body 2 by the lock 31 and the front panel 3 and can not be detached.

I claim:

1. A computer mainframe housing, comprising an under body, a cross bar fastened inside said under body for hanging a holder for 3½″ diskdrive, a top cover covering said under body, and a front panel covering said under body at a front side thereof;

said under body further comprising a front side wall and a rear side wall vertically disposed at two opposite sides thereof, two vertical, symmetrical end stops vertically disposed at two opposite ends thereof, a frame for 5¼″ diskdrive secured behind a slot on front side wall, and a shackle secured to said rear side wall at an outer side by spring means for securing said under body to a support, said end stops each having a plurality of notches, said front side wall having at least one retaining hole and a key hole and an inward top flange, said rear side wall having an inward peripheral flange, and a bolt hole on an interface card holder thereof, said inward peripheral flange having an opening above the bolt hole on said interface card holder, said frame for 5¼″ diskdrive having a plurality of spaced hooks on a top edge thereof;

said cross bar having a bolt hole at one end thereof inserted in the opening on the inward peripheral flange of said rear side wall of said under body and secured to the bolt hole on said interface card holder by a screw, at least one hook at an opposite end thereof respectively hooked in the at least one retaining hole on said front side wall of said under body, and a plurality of hooks on a top edge thereof respectively;

said holder for 3½″ diskdrive hung between said cross bar and said frame for 5¼″ diskdrive, having two row of holes at two opposite ends respectively hung on the hooks on said cross bar and the hooks on said frame for 5¼″ diskdrive;

said front panel fixedly secured to said top cover, said front panel having a lock controlled by a key to lock a cam in said key hole on said front side wall of said under body; and said top cover further comprising a plurality of hooks respectively hooked in the peripheral flange of said rear side wall and the notches on said two end stops of said under body.

* * * * *